United States Patent
Rhee

(10) Patent No.: US 6,674,799 B2
(45) Date of Patent: Jan. 6, 2004

(54) APPARATUS FOR CONVERTING SCREEN ASPECT RATIO

(75) Inventor: Seung Hyeon Rhee, Seoul (KR)

(73) Assignee: LG Electronics Inc., Seoul (KR)

( * ) Notice: Subject to any disclaimer, the term of this patent is extended or adjusted under 35 U.S.C. 154(b) by 486 days.

(21) Appl. No.: 09/782,425

(22) Filed: Feb. 13, 2001

(65) Prior Publication Data

US 2001/0017890 A1 Aug. 30, 2001

(30) Foreign Application Priority Data

Feb. 28, 2000 (KR) .......................................... 2000-9857

(51) Int. Cl.[7] ................................................ H04N 7/12
(52) U.S. Cl. ............................ 375/240.21; 375/240.25; 348/445
(58) Field of Search .................. 375/240.21, 240.25, 375/240.29, 240.16; 348/445, 913, 416.1, 699, 700

(56) References Cited

U.S. PATENT DOCUMENTS

| | | | | |
|---|---|---|---|---|
| 5,793,434 A | * | 8/1998 | Lee ............................ | 348/445 |
| 5,812,791 A | * | 9/1998 | Wasserman et al. ......... | 709/247 |
| 5,999,220 A | * | 12/1999 | Washino ...................... | 348/441 |
| 6,115,072 A | * | 9/2000 | Vuong et al. ................ | 348/445 |
| 6,370,198 B1 | * | 4/2002 | Washino ................ | 375/240.36 |

OTHER PUBLICATIONS

Kim et al., "Development of aspect ratio conversion system using scan–line video processor", Proceedings of International Conference on Consumer Electronics, pp. 46–47, Jun. 1995.*

Li et al., "A flexible display module for DVD and set–top box applcations", IEEE Transactions on Consumer Electronics, vol. 43 Iss. 3, pp. 496–503, Aug. 1997.*

* cited by examiner

Primary Examiner—Vu Le
(74) Attorney, Agent, or Firm—Lee, Hong, Degerman, Kang & Schmadeka

(57) ABSTRACT

An apparatus converts a screen with an aspect ratio of 4:3 to a screen with an aspect ratio of 16:9. When the input image is given as a frame buffer that is not encoded, the present invention extracts motion vector by performing block motion matching operation, and when the input image is a digitally encoded bit stream, it extracts motion vectors from the decoded data. The motion vectors are subjected to filtering in terms of time and space. The apparatus extracts global motion information from the motion vectors that have been filtered. Utilizing the global motion information extracted from and the partial images from the adjacent frames, the present invention generates the image information that is displayed on the blank regions of the screen. The blank regions on left and right of the screen caused by the differences in the screen aspect ratios are composed from the actual image information.

27 Claims, 3 Drawing Sheets

APPARATUS FOR CONVERTING SCREEN ASPECT RATIO

CROSS REFERENCE TO RELATED ART

This application claims the benefit of Korean Patent Application No. 2000-9857, filed on Feb. 28, 2000, which is hereby incorporated by reference in its entirety.

BACKGROUND OF THE INVENTION

1. Field of the Invention

The present invention relates to a digital television, and more particularly, to an apparatus for converting screen aspect ratio that converts the input images that are in a random screen aspect ratio into the images that are in different screen aspect ratio.

2. Discussion of the Related Art

Presently, there are many television broadcast standards in existence. In the United States, the most common standard is the National Television Systems Committee (NTSC) standard which provides for an interlaced image with a 4:3 aspect ratio having 525 lines per frame. The video data transmitted by the NTSC television broadcast signal is an analog signal that may be digitally sampled to yield 720 square pixels horizontally on each of 480 lines.

The horizontal and vertical resolution of an image is typically expressed as an array of pixels, for example an NTSC image is represented as 720×480. Generally, the 4:3 aspect ratio standards is called Standard Definition Television (SDTV).

Digital television (DTV) receivers are being implemented substantially in accordance with the transmission standards established by the Advanced Television Standards Committee (ATSC). A similar standard is the European Digital Video Broadcasting (DVB) standard. A compressed digital video system is described in the ATSC digital television standard document A/53, incorporated herein by reference.

The new DTV standards allow broadcasters to deliver virtually any format up to 1920×1080 pixels. As such, DTV receivers must be capable of receiving and processing a multiplicity of video formats. Therefore, a need exists in the art for a television receiver that is capable of receiving a multiplicity of formats and automatically adjusting video and other processing parameters depending upon the format of a particular received signal. Specifically, a need exists for a video processing system suitable for use in such a multiple format television receiver.

Typically, television display systems are only capable of receiving one broadcast format. In the past that has been acceptable to consumers because only one television broadcast format was available in each location and the television broadcast standard was well established and therefore very stable. With the arrival of wide-TV and HDTV, it is envisioned that not only more than one broadcast standard will be available to consumers in many locations, but that existing standards will gradually become obsolete.

Following the most recent availability of digital television sets, the 16:9 screen aspect ratio generally shown in movie theaters, is expected to become popular. Already, even before the availability of digital television, the television sets with wide screen (e.g., 16:9 screen aspect ratio) capability have been sold in the market. Such wide screen television system adopts the formula of showing the existing 4:3 screen aspect ratio for general broadcast program while showing 16:9 screen aspect ratio for certain programs.

To show the programs that are broadcast in 4:3 screen aspect ratio on the wide screen, the related art devices generally adopt either one of the formulae of establishing regions where no signals are present on left and right edges of the screen. Such devices also produce an enlarged screen by eliminating the signals representative of the top and bottom regions of the display screen because the relative importance of these signals is less in their natures. Sometimes, a formula wherein these two methods are compromised is also used.

However, by being unable to optimally utilize the given screen space or by discarding a substantial portion of the received signals, these methods have problems of failing to respond properly to the improved resolution of the screen that has an 16:9 aspect ratio and to the conversion of the other image sources such as movie films, etc. The underlying causes of these are in the limited image signal processing capacity of the existing analog television and the restriction stemming from attempting to realize the necessary functionality using relatively simple interpolation or decimation and filtering only. Therefore, there is a need for a television display system that is capable of converting and displaying, for example, broadcast and computer generated images from 4:3 to 16:9 aspect ratios.

SUMMARY OF THE INVENTION

Accordingly, the present invention is directed to a screen aspect ratio conversion apparatus that substantially obviates one or more of the problems due to limitations and disadvantages of the related art.

It is an object of the present invention to provide an apparatus for converting screen aspect ratio that composes or generates the image information of the regions for which no signal is given by utilizing the image information that is estimated from previous or subsequent frames.

Another objective of the present invention is providing an apparatus for converting screen aspect ratio that composes the image information of the regions for which no signal is given by utilizing the motion information that is obtained from the inputted image.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve the above object, there is provided a television receiver system for displaying video signals received in a first format (for example, 4:3 aspect ratio) to a second format (for example, 16:9 aspect ratio) and operable with at least one of encoded bit stream signal and sampled video signal. The receiver system comprises a decoder for decoding the bit stream signal and outputting a decoded video signal and a motion vector signal included in the bit stream signal; first and second frame buffers for storing at least one of the decoded video signal and the sampled video signal; a motion vector estimation unit for estimating block motion vectors by comparing a first frame with a second frame stored in the first and second frame buffers and outputs an estimated motion vector signal, wherein the first and second frames are displaced in time; a motion vector filter for filtering at least one of the motion vector signal from the decoder and the estimated motion vector signal from the motion vector estimation unit by providing at least one of spatial and temporal filtering and producing a filtered motion vector signal; a global motion information extraction unit for extracting the global motion information from the filtered motion vector signal and outputting a global motion information signal; and a composite image generator for generating data for image signal lacking regions in a frame in response to the global motion information signal, the filtered motion vector signal and data from first frame buffer.

According to one aspect of the present invention, the aspect ratio conversion apparatus used in a receiver system further comprises a scene change detector for detecting scene change and outputting a scene change detection signal to the composite image generator.

According to another aspect of the present invention, the filtered motion vector signal is produced with the spatial filtering by establishing an N×N window, where N is an integer, on a vector matrix representative of the motion vector signal and taking two-dimensional vector median filtering. Alternatively, the filtered motion vector signal is produced with the temporal filtering by taking scalar median filtering out of motion vector signal that correspond to the identical locations on the M number of frames, where M is an integer and the frames are preferably sequential in time.

According to another aspect of the present invention, the composite image generator uses only the filtered motion vector signal to generate the data for image signal lacking regions if the global motion information signal contains invalid global motion information. If the global motion information signal contains valid global motion information, the composite image generator compares the filtered motion vector signal with the global motion information signal and uses only the filtered motion vector signal if the difference between the filtered motion vector signal and the global motion information signal exceeds a predetermined quantity.

If the global motion information signal contains valid global motion information, the composite image generator compares the filtered motion vector signal with the global motion information signal and uses only the global motion information signal if the difference between the filtered motion vector signal and the global motion information signal is less than a predetermined quantity.

According to another aspect of the present invention, the composite image generator uses only the filtered motion vector signal to generate the data for image signal lacking regions if the scene change detection signal is enabled. If the scene change detection signal is disabled, the composite image generator compares the filtered motion vector signal with the global motion information signal and uses only the filtered motion vector signal if the difference between the filtered motion vector signal and the global motion information signal exceeds a predetermined quantity.

If the scene change detection signal is disabled, the composite image generator compares the filtered motion vector signal with the global motion information signal and uses only the global motion information signal if the difference between the filtered motion vector signal and the global motion information signal is less than a predetermined quantity.

According to another aspect of the present invention, the composite image generator comprises a composite image size calculation unit for calculating the size of a composite image in response to the global motion information signal and a size of a previous composite image; a parallel shift unit for parallelly shifting the first frame received from the first frame buffer in response to a result of the composite image size calculation unit and outputting a shifted image signal; a third frame buffer for storing the shifted image signal and outputting a composite signal; and an image conversion unit for producing the data for image signal lacking regions in a form of a background image signal in response to the global motion information signal, the filtered motion vector signal, the scene change detection signal and the composite signal, wherein the third frame buffer stores the composite signal which comprises the background image signal overwritten by the shifted image signal.

According to another aspect of the present invention, the size of the composite image signal is determined by the image conversion unit in response to the global motion control signal and the filtered motion vector signal.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Hereinafter, the present invention will be described with respect to the preferred embodiment illustrated in the annexed drawings.

Figure 1:
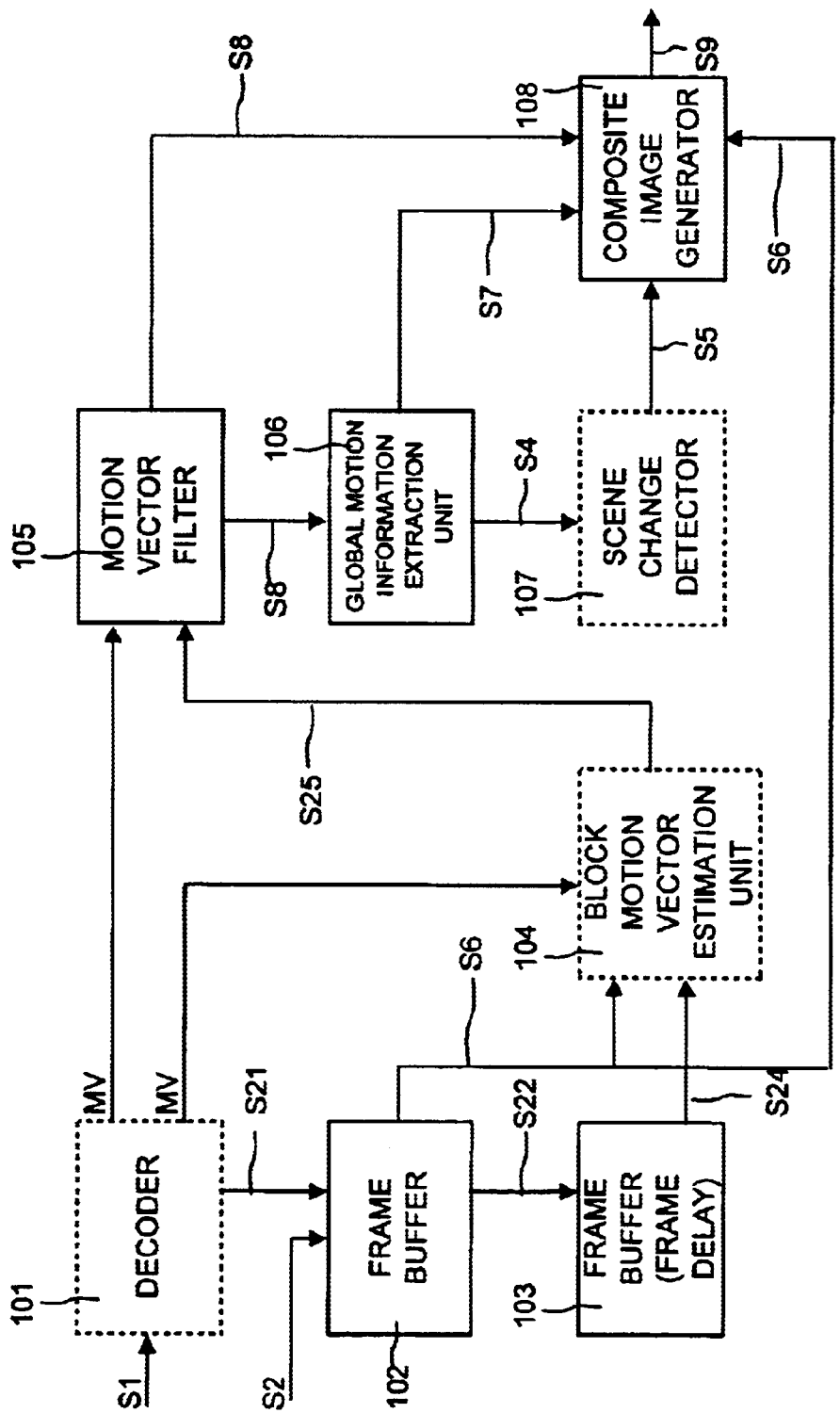
FIG. 1 is a block diagram of a preferred embodiment of the present invention.

FIG. 1 is a block diagram of an aspect ratio conversion apparatus 100 according to the present invention. The aspect ratio conversion apparatus 100 preferably comprises a decoder 101, first and second frame buffers 102 and 103, a motion vector estimation unit 104, a motion vector filter 105, a global motion information extraction unit 106, a scene change detector 107, and a composite image generator 108. According to an embodiment of the present invention, the scene change detector 107 may be omitted from the aspect ratio conversion apparatus 100 without deviating from the present invention. The aspect ratio conversion apparatus 100 according to the preferred embodiment of the present invention has at least two inputs, namely, a digitally encoded bit stream signal S1 and a digitally sampled signal S2 of an analog signal; and at least one output, namely an output image signal S9.

Referring to FIG. 1, the decoder 101 decodes the encoded video bit stream signal S1 reversing the encoding process, and if present, extracts motion vector signal MV from the decoded video signals. The first and second frame buffers 102 and 103 store the decoded video signal S21 from the decoder 101 or the digitally sampled video signals S2 in a time displaced manner. Preferably, the second frame buffer 103 stores previous frame information and the first frame buffer 102 stores present frame information. The motion vector estimation unit 104 estimates block motion vectors by comparing, preferably in block units, the present frame signals with the previous frame signals stored in the first and second frame buffers 102 and 103. The motion vector estimation unit 104 then outputs an estimated motion vector signal S25 to the motion vector filter 105. The motion vector filter 105 performs filtering operation by using the estimated motion vector signal S25 and the motion vector signal MV outputted from the decoder 101 as input and produces a filtered motion vector signal S8 as an output.

Further referring to FIG. 1, the global motion information extraction unit 106 extracts the global motion information from the filtered motion vector signal S8. In addition, the composite image generator 108 generates composite images utilizing the global motion information and the filtered motion vectors. The scene change detector 107 utilizes the global motion information from the global motion information extraction unit 106, and after detecting a scene change, outputs a scene change detection signal S5 to the composite image generator 108. As a result, the aspect ratio conversion apparatus 100 can handle both instances when the inputted signals are digitally encoded bit stream signal S1 as well as when they are digitally sampled signals S2 from analog signals.

When the input signal is a digitally encoded bit stream signal S1, the encoded bit stream signal S1 is decoded through the decoder 101, reversing the encoding process, and then stored in a time displaced manner, preferably sequentially, in the first and the second frame buffers 102 and 103. If the motion vectors are also included in the encoded bit stream signal S1, the motion vectors may be detected in the decoding process of the decoder 101. Alternatively, the digitally sampled video signal S2 is directly stored sequentially in the first and the second frame buffers 102 and 103 bypassing the decoder 101.

The block motion vector estimation unit 104 compares the present frame information stored in the first frame buffer 102 with the immediately previous frame information stored in the second frame buffer 103 in the units of block to estimate the block motion vectors. The block motion vector estimation unit 104 then outputs the estimated motion vector signal S25 to the motion vector filter 105. Preferably, the block motion vector estimation unit 104 may use block-matching algorithms known to one of ordinary skill in the art for the block motion vector estimation. The block-matching algorithm may also be substituted with other well known estimations to estimate the actual motion information.

In the event the input signal is the encoded video bit stream signal S1, the block motion vector estimation unit 104 takes the motion vector signal MV extracted from the decoder 101 as input signals and uses them as initial values for motion vector search. Additionally, in the event the encoding method uses a bi-directional motion estimation, as in MPEG, the block motion vector estimation unit 104 preferably uses only a forward motion vector as an initial value.

Alternatively, when the encoded bit stream signal S1 is provided to the aspect ratio conversion apparatus 100, the block motion vector estimation unit 104 may be bypassed to enhance the digital signal processing speed. By providing the motion vector signal MV extracted during the decoding process from the decoder 101 to the motion vector filter 105, the signal processing time can be reduced. In this case, for the blocks for which no motion vector is provided, that is, for the blocks that are encoded within blocks, a separate process is performed as set forth in the item (b) of the motion vector filter 105 explanation below. Alternatively, when the input signal is a digitally sampled video signal S2, the initial value of the search is substituted with the vector value of the identical location block of the previous frame.

In the preferred embodiment of the present invention, the motion vector filter 105 has a built-in buffer to store the motion vectors that correspond with the finite number of frames that reach the present point of time for each block that comprises the frame. This buffer stores the motion vectors corresponding to multiple frames, preferably at least 3 consecutive frames.

By evaluating changes in the motion vectors stored in the buffer, more reliable motion information can be calculated:
(a) When the decoded motion vectors do not reflect the actual motions; or
(b) When processing the encoded bit stream without motion vectors.

In other words, the motion vector filter 105 is for minimizing the possible errors that could be generated in the process of searching for the motion vectors by filtering the inputted motion vector information in terms of space and/or time. The spatial filtering is performed by establishing, for example, a 3×3 window on the vector matrix that forms the motion vector signal and of the 9 motion vectors that are included in this window, taking two-dimensional vector median filtering. In addition, the temporal filtering is performed by taking scalar median filtering out of the motion vectors that correspond with the identical positions on, for example, 3 consecutive frames in the order of being given to the frame buffer. The sizes of the windows used for the spatial filtering and temporal filtering may be substituted with some other values than 3×3 and 3.

The output from the motion vector filter 105, namely, the filtered motion vector signal S8, is provided to the global motion information extraction unit 106 and the composite image generator 108.

The global motion information extraction unit 106 makes an overall evaluation of the motion vectors that are processed through the motion vector filter 105 and determines whether the filtered motion vector signal S8 may be expressed in a common motion form. If the filtered motion vector signal S8 is expressed as a common motion form, the global motion information extraction unit 106 outputs the global motion information signal S7, which includes the global motion information, to the composite image generator 108. For this operation, a histogram of the filtered motion vector signal S8 of the motion vector filter 105 is created and the concentration level is evaluated using the variances.

If the result of the histogram evaluation shows that the concentration level is high (for example, the overall motion of the screen is judged to be uniform enough to ignore the local motion of moving objects such as cars and people), the global motion information extraction unit 106 calculates the effective global motion information (for example, coefficient for panning, tilting or zooming) based on the histogram. For example, when the entire screen is in motion as the camera was in motion at the time the present image was filmed, or if the camera was moved left and right, or up and down when the present image was filmed in order for panorama effect, the panning coefficient is calculated. If the image represents a camera being tilted in an arbitrary angle, the tilting coefficient is calculated. If the image was filmed using a zoom function, the zooming coefficient is calculated.

On the other hand, if the evaluation of the histogram indicates the concentration level is low so that the relevancy between two images is determined to be low, a scene change is assumed and a global motion information signal S7 is delivered to the composite image generator 108. The low relevancy between two images may occur when there are a lot of local motions or as a result of scene change.

According to the preferred embodiment of the present invention, an optional scene change detector 107 may be used to determine whether a scene change has occurred. In such a case, the output signal S4 of the global motion information extraction unit 106 is utilized. For example, when the global motion information extraction unit 106 determines that the present and previous screens are not related, as the histogram distribution is wide and uniform, a scene change detection signal S5 indicating, for example, a scene change is enabled or activated and outputted to the composite image generator 108.

Figure 2:
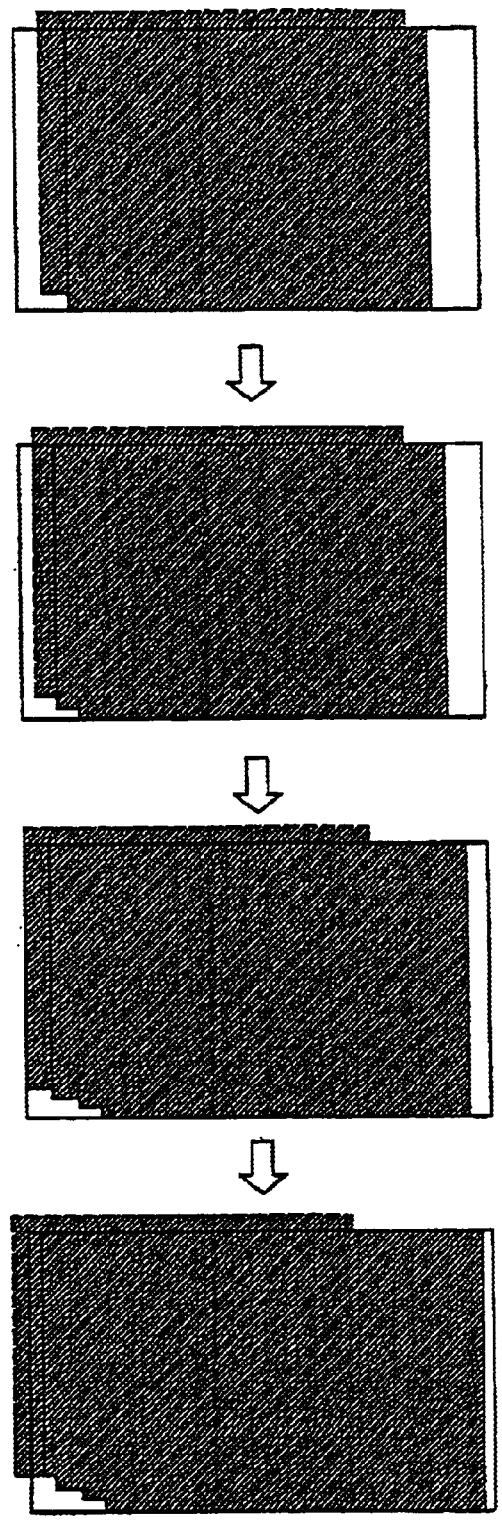
FIG. 2 illustrates the screen aspect ratio conversion processes according to the present invention.

The composite image generator 108, responding to the outputs from the motion vector filter 105 and from the global motion information extraction unit 106, generates the final output images as illustrated in FIG. 2. The output of the composite image generator 108 is referred to as a composite signal S9. In the center of the entire screen space, including the blank regions in left and right, the composite image generator 108 displays the composite image and outputs to the screen composite image that corresponds with each frame.

The composite image generator 108 generates different composite images depending on the outputs from the global motion information extraction unit 106 and the scene change detector 107. For example:

(a) When the result from the global motion information extraction unit 106 shows no valid global motion information (for example, camera coefficient such as tilting, panning or zooming coefficient) or when the scene change detection signal S5 is activated, the composite image generator 108 generates a composite image using only the filtered motion vector signal S8 from the motion vector filter 105;

(b) When the result from the global motion information extraction unit 106 shows the existence of valid global motion information or the scene change detection signal S5 is not activated (or disabled), the filtered motion vector signal S8 of the motion vector filter 105 is compared with the global motion information signal S7, which includes the global motion information, from the global motion information extraction unit 106. In the event the difference between the two signals is large (for example, exceeding a predetermined quantity), the local motion is judged to be substantial and the composite image generator 108 again generates a composite image using only the output signals S8 from the motion vector filter 105; and (c) When other results are shown, that is, when the composite image generator 108 determines that the reliability of the global motion information is high and the local motion is insignificant, it generates composite image using the valid global motion information signal S7 calculated in the global motion information extraction unit 106.

Figure 3:
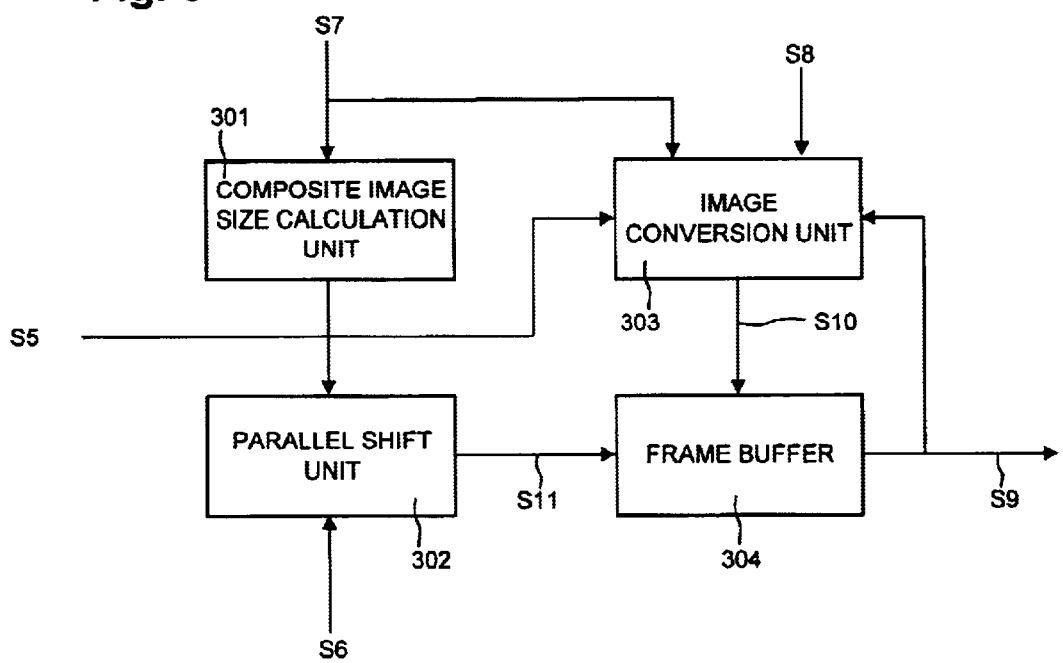
FIG. 3 is a block diagram of the composite image generator of the FIG. 1.

FIG. 3 is a block diagram of the composite image generator 108 that generates composite image through the above described processes. The composite image generator 108 is preferably comprised of a composite image size calculation unit 301, a parallel shift unit 302, an image conversion unit 303 and a frame buffer 304.

According to the preferred embodiment of the present invention, the composite image size calculation unit 301 calculates the size of the composite image using the global motion information signal S7 from the global motion information extraction unit 106 and the size of the previous composite image. The parallel shift unit 302 shifts the present frame, which was outputted from the first frame buffer 102 according to the result from the composite image size calculation unit 301. The parallel shift unit 302 outputs a shifted image signal S11. The frame buffer 304 stores the image information of the present frame, which was, for example, parallel shifted by the parallel shift unit 302 (the shifted image signal) and the reconstituted image information of the regions for which no signal was given. The image conversion unit 303 uses the motion vector filter signal S8, the global motion information signal S7 and the feedback image information (the output image signal S9) of the frame buffer 304 and creates image information for the regions for which no information was given from and outputs the image signal S10 to the frame buffer 304.

FIG. 2 illustrates the aspect ratio conversion process by showing the steps in which the left and right edges of the display screen are being composed. In FIG. 3, the composite image size calculation unit 301 calculates the size of the total composite image that is going to be displayed using the global motion information signal S7 of the global motion information extraction unit 106 and the size of the previous composite image. It then outputs the result to the parallel shift unit 302.

The parallel shift unit 302 parallel shifts the present frame image information that has been received from the first frame buffer 102 according to the total composite image size calculated by the composite image size calculation unit 301 as illustrated in FIG. 2 and then outputs it to the frame buffer 304.

The output from the frame buffer 304 is outputted to the display device for screen display and at the same time is provided as a feedback to the image conversion unit 303 in order to be utilized as the background for the next input frame's image composition.

If the global motion information signal S7 from the global motion information extraction unit 106 is not valid or a scene change detection signal S5 is activated, the image conversion unit 303 composes the background image, i.e., the image for the regions where no signal exists, using the filtered motion vector signal S8 and the previous frame's image information feedback from frame buffer 304, and stores it in frame buffer 304.

Further, in the event the global motion information signal S7 from the global motion information extraction unit 106 is valid and the scene change detection signal S5 is not activated, the image conversion unit 303 compares the filtered motion vector signal S8 with the global motion information signal S7, and if the difference between the two signals is significant, constructs an image for the regions, typically left and right edges of the display screen, where no signal exists using the filtered motion vector signal S8 and the previous frame's image information feedback from the frame buffer 304, and then stores it in the frame buffer 304.

On the other hand, other than the above described two cases, the image conversion unit 303 composes or produces the images for the regions where no signal exists using the valid global motion information signal S7 from the global motion information extraction unit 106 and the previous frame image information feedback from the frame buffer 304, and stores it in the frame buffer 304. Such image data for the blank region is outputted as a background image signal S10.

The frame buffer 304 stores the background image signal S10 from the image conversion unit 303, which utilizes the image information of the previous frames. The frame buffer 304 also stores the present frame image information that was parallel shifted by parallel shift unit 302 according to the total composite image size calculated by the composite image size calculation unit 301 as illustrated in FIG. 2 and stores it in overwrite format. Preferably, the size of the information stored in the frame buffer 304 is determined by the image conversion unit 303 based on the global motion information signal S7 and the filtered motion vector signal S8.

As described above, the present invention has an effect of maximally utilizing the received image signals without discarding them while maintaining the screen resolution of the existing screen aspect ratio conversion methods which neither enlarges nor clips the screen in order to fit into the 16:9 screen aspect ratio.

The digital television that is going to be generalized will have a digital signal processing device with powerful built-in arithmetic functions, and the roles and the relative importance of the system with respect to format conversion or image enhancement are becoming heavier. Particularly, since the structure that utilizes the motion information within the images is commonly adopted for digital bit stream decoding and the signal processing for image enhancement, when this information is utilized for the screen aspect ratio conversion as in the present invention, it has a great effect from the aspect of efficient utilization of the resources as well.

As described above, the apparatus for converting screen aspect ratio according to the present invention converts the conventional video images in 4:3 screen aspect ratio to the images in 16:9 screen aspect ratio by using the motion information of moving images. This is accomplished by reconstituting the left and right edge regions, which are usually blanks due to the difference in the screen aspect ratio, by using the actual image information, and thus can utilize the given screen space appropriately without discarding any of the received signals.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A video receiver system for displaying video signals received in a first format to a second format and operable with at least one of encoded bit stream signal and sampled video signal, the receiver system comprising:
    a decoder for decoding the bit stream signal and outputting a decoded video signal and a motion vector signal included in the bit stream signal;
    first and second frame buffers for storing at least one of the decoded video signal and the sampled video signal;
    a motion vector estimation unit for estimating block motion vectors by comparing a first frame with a second frame stored in the first and second frame buffers and outputs an estimated motion vector signal, wherein the first and second frames are displaced in time;
    a motion vector filter for filtering at least one of the motion vector signal from the decoder and the estimated motion vector signal from the motion vector estimation unit by providing at least one of spatial and temporal filtering and producing a filtered motion vector signal;
    a global motion information extraction unit for extracting the global motion information from the filtered motion vector signal and outputting a global motion information signal; and
    a composite image generator for generating data for image signal lacking regions in a frame in response to the global motion information signal, the filtered motion vector signal and data from first frame buffer.

2. The video receiver system of claim 1, further comprising a scene change detector for detecting scene change and outputting a scene change detection signal to the composite image generator.

3. The video receiver system of claim 1, wherein the filtered motion vector signal is produced with the spatial filtering by establishing an N×N window, where N is an integer, on a vector matrix representative of the motion vector signal and taking two-dimensional vector median filtering.

4. The video receiver system of claim 3, wherein the N×N window comprises a 3×3 window.

5. The video receiver system of claim 1, wherein the filtered motion vector signal is produced with the temporal filtering by taking scalar median filtering out of motion vector signal that correspond to the identical locations on the M number of consecutive frames, where M is an integer.

6. The video receiver system of claim 1, wherein the composite image generator uses only the filtered motion vector signal to generate the data for image signal lacking regions if the global motion information signal contains invalid global motion information.

7. The video receiver system of claim 1, wherein if the global motion information signal contains valid global motion information, the composite image generator compares the filtered motion vector signal with the global motion information signal and uses only the filtered motion vector signal if the difference between the filtered motion vector signal and the global motion information signal exceeds a predetermined quantity.

8. The video receiver system of claim 1, wherein if the global motion information signal contains valid global motion information, the composite image generator compares the filtered motion vector signal with the global motion information signal and uses only the global motion information signal if the difference between the filtered motion vector signal and the global motion information signal is less than a predetermined quantity.

9. The video receiver system of claim 2, wherein the composite image generator uses only the filtered motion vector signal to generate the data for image signal lacking regions if the scene change detection signal is enabled.

10. The video receiver system of claim 2, wherein if the scene change detection signal is disabled, the composite image generator compares the filtered motion vector signal with the global motion information signal and uses only the filtered motion vector signal if the difference between the filtered motion vector signal and the global motion information signal exceeds a predetermined quantity.

11. The video receiver system of claim 2, wherein if the scene change detection signal is disabled, the composite image generator compares the filtered motion vector signal with the global motion information signal and uses only the global motion information signal if the difference between the filtered motion vector signal and the global motion information signal is less than a predetermined quantity.

12. The video receiver system of claim 1, wherein the composite image generator comprises:
    a composite image size calculation unit for calculating the size of a composite image in response to the global motion information signal and a size of a previous composite image;
    a parallel shift unit for parallelly shifting the first frame received from the first frame buffer in response to a result of the composite image size calculation unit and outputting a shifted image signal;

a third frame buffer for storing the shifted image signal and outputting a composite signal; and an image conversion unit for producing the data for image signal lacking regions in a form of a background image signal in response to the global motion information signal, the filtered motion vector signal, the scene change detection signal and the composite signal, wherein the third frame buffer stores the composite signal which comprises the background image signal overwritten by the shifted image signal.

13. The video receiver system of claim 12, wherein a size of the composite image signal is determined by the image conversion unit in response to the global motion control signal and the filtered motion vector signal.

14. A video receiver system for displaying video signals received in a first format to a second format and operable with an input video signal, the receiver system comprising:

a decoder for decoding the input video signal and outputting a decoded video signal and a motion vector signal if provided in the input video signal, wherein if the input video signal is a sampled signal, the decoder is bypassed;

a first frame buffer for storing an output signal from the decoder;

a motion vector filter for filtering the motion vector signal from the decoder by providing at least one of spatial and temporal filtering and producing a filtered motion vector signal;

a global motion information extraction unit for extracting the global motion information from the filtered motion vector signal and outputting a global motion information signal; and a composite image generator for generating data for image signal lacking regions in a frame in response to the global motion information signal, the filtered motion vector signal and data from the first frame buffer.

15. The video receiver system of claim 14, further comprising:

a second frame buffer; and a motion vector estimation unit for estimating motion vectors by comparing a first frame with a second frame stored in the first and second frame buffers and outputting an estimated motion vector signal.

16. The video receiver system of claim 15, wherein if the motion vector signal is not provided from the decoder, the motion vector filter filters the estimated motion vector signal from the motion vector estimation unit by providing at least one of spatial and temporal filtering and producing a filtered motion vector signal.

17. The video receiver system of claim 14, further comprising a scene change detector for detecting scene change and outputting a scene change detection signal to the composite image generator.

18. The video receiver system of claim 14, wherein the filtered motion vector signal is produced with the spatial filtering by establishing an N×N window, where N is an integer, on a vector matrix representative of the motion vector signal and taking two-dimensional vector median filtering.

19. The video receiver system of claim 14, wherein the filtered motion vector signal is produced with the temporal filtering by taking scalar median filtering out of motion vector signal that correspond to the identical locations on the M number of consecutive frames, where M is an integer.

20. The video receiver system of claim 14, wherein the composite image generator uses only the filtered motion vector signal to generate the data for image signal lacking regions if the global motion information signal contains invalid global motion information.

21. The video receiver system of claim 14, wherein if the global motion information signal contains valid global motion information, the composite image generator compares the filtered motion vector signal with the global motion information signal and uses only the filtered motion vector signal if the difference between the filtered motion vector signal and the global motion information signal exceeds a predetermined quantity.

22. The video receiver system of claim 14, wherein if the global motion information signal contains valid global motion information, the composite image generator compares the filtered motion vector signal with the global motion information signal and uses only the global motion information signal if the difference between the filtered motion vector signal and the global motion information signal is less than a predetermined quantity.

23. The video receiver system of claim 17, wherein the composite image generator uses only the filtered motion vector signal to generate the data for image signal lacking regions if the scene change detection signal is enabled.

24. The video receiver system of claim 17, wherein if the scene change detection signal is disabled, the composite image generator compares the filtered motion vector signal with the global motion information signal and uses only the filtered motion vector signal if the difference between the filtered motion vector signal and the global motion information signal exceeds a predetermined quantity.

25. The video receiver system of claim 17, wherein if the scene change detection signal is disabled, the composite image generator compares the filtered motion vector signal with the global motion information signal and uses only the global motion information signal if the difference between the filtered motion vector signal and the global motion information signal is less than a predetermined quantity.

26. The video receiver system of claim 14, wherein the composite image generator comprises:

a composite image size calculation unit for calculating the size of a composite image in response to the global motion information signal and a size of a previous composite image;

a parallel shift unit for parallelly shifting the first frame received from the first frame buffer in response to a result of the composite image size calculation unit and outputting a shifted image signal;

a third frame buffer for storing the shifted image signal and outputting a composite signal; and an image conversion unit for producing the data for image signal lacking regions in a form of a background image signal in response to the global motion information signal, the filtered motion vector signal, the scene change detection signal and the composite signal, wherein the third frame buffer stores the composite signal which comprises the background image signal overwritten by the shifted image signal.

27. The video receiver system of claim 26, wherein a size of the composite image signal is determined by the image conversion unit in response to the global motion control signal and the filtered motion vector signal.

* * * * *